(12) United States Patent
Shomura et al.

(10) Patent No.: US 11,921,496 B2
(45) Date of Patent: Mar. 5, 2024

(54) INFORMATION PROCESSING APPARATUS, INFORMATION PROCESSING METHOD AND COMPUTER READABLE MEDIUM

(71) Applicant: MITSUBISHI ELECTRIC CORPORATION, Tokyo (JP)

(72) Inventors: Shun Shomura, Tokyo (JP); Satoshi Noguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 156 days.

(21) Appl. No.: 17/386,148

(22) Filed: Jul. 27, 2021

(65) Prior Publication Data
US 2021/0356947 A1 Nov. 18, 2021

Related U.S. Application Data

(63) Continuation of application No. PCT/JP2019/006655, filed on Feb. 21, 2019.

(51) Int. Cl.
*G05B 19/418* (2006.01)

(52) U.S. Cl.
CPC ... *G05B 19/41865* (2013.01); *G05B 19/4183* (2013.01); *G05B 19/41835* (2013.01); *G05B 2219/23064* (2013.01)

(58) Field of Classification Search
CPC .......... G05B 19/41865; G05B 19/4183; G05B 19/41835; G05B 2219/23064; Y02P 90/02; G06F 8/71; G06F 11/3692; G06F 11/3696; G06F 8/70; G06F 9/5038; G06F 18/20

See application file for complete search history.

(56) References Cited

U.S. PATENT DOCUMENTS

2008/0310736 A1* 12/2008 Chattopadhyay ... G06F 11/3692
382/218
2017/0256283 A1 9/2017 Yajima et al.
2019/0116577 A1* 4/2019 Wang ................... G01S 5/0036
(Continued)

FOREIGN PATENT DOCUMENTS

JP 8-249052 A 9/1996
JP 2002-108652 A 4/2002
(Continued)

OTHER PUBLICATIONS

Office Action dated Mar. 7, 2022 issued in corresponding Indian Application No. 202147033508 with an English translation.
(Continued)

*Primary Examiner* — Thomas C Lee
*Assistant Examiner* — Tyler Dean Hedrick
(74) *Attorney, Agent, or Firm* — BIRCH, STEWART, KOLASCH & BIRCH, LLP

(57) ABSTRACT

A collation section (14) extracts a difference between two pieces of operation setting data which are pieces of data each of which is for setting operation in a device, and generates difference information indicating the extracted difference, before a user requests. A collation result management section (15) stores in a storage device (150), the difference information generated by the collation section (14). A display section (16) acquires the difference information from the storage device (150) and outputs the acquired difference information to a display device when the user requests.

5 Claims, 14 Drawing Sheets

(56) References Cited

U.S. PATENT DOCUMENTS

| | | | |
|---|---|---|---|
| 2019/0205128 A1* | 7/2019 | van Schaik | G06F 8/77 |
| 2020/0143163 A1* | 5/2020 | Ackerman | G06V 40/19 |

FOREIGN PATENT DOCUMENTS

| | | |
|---|---|---|
| JP | 2006-309538 A | 11/2006 |
| JP | 2011-59918 A | 3/2011 |
| JP | 2013-30034 A | 2/2013 |
| JP | 2013-109713 A | 6/2013 |
| JP | 2017-10147 A | 1/2017 |
| WO | WO2019/003351 A1 | 1/2019 |

OTHER PUBLICATIONS

International Search Report, issued in PCT/JP2019/006655, dated May 7, 2019.
Office Action dated Mar. 30, 2022 in corresponding German Application No. 11 2019 006 694.3.

* cited by examiner

Fig. 10

| MATCHING RATE | INSTALLING DESTINATION A | INSTALLING DESTINATION B | INSTALLING DESTINATION C | INSTALLING DESTINATION D |
|---|---|---|---|---|
| INSTALLING DESTINATION A | | | | |
| INSTALLING DESTINATION B | 60 % | | | |
| INSTALLING DESTINATION C | 40 % | 50 % | | |
| INSTALLING DESTINATION D | 20 % | 30 % | 10 % | |

Fig. 11

| ORDER | 1 | 2 | 3 | 4 | 5 | 6 |
|---|---|---|---|---|---|---|
| COLLATION SUBJECTS | INSTALLING DESTINATIONS A, B | INSTALLING DESTINATIONS B, C | INSTALLING DESTINATIONS A, C | INSTALLING DESTINATIONS B, D | INSTALLING DESTINATIONS A, D | INSTALLING DESTINATIONS C, D |

Fig. 13

```
SCREEN {
SCREEN TITLE = "Screen"
SCREEN SIZE = "640, 480"
SCREEN BACKGROUND COLOR = " #FFFF"
COMPONENT 1 {
    COMPONENT TITLE = "Part1"
    CATEGORY = "Switch"
    ID = "0001"
    CENTER COORDINATES = "160, 360"
    WIDTH = "160"
    HEIGHT = "80"
}
COMPONENT 2 {
    COMPONENT TITLE = "Part2"
    CATEGORY = "Lamp"
    ID = "0002"
    CENTER COORDINATES = "200, 160"
    WIDTH = "240"
    HEIGHT = "160"
}
}
```

INFORMATION PROCESSING APPARATUS, INFORMATION PROCESSING METHOD AND COMPUTER READABLE MEDIUM

CROSS REFERENCE TO RELATED APPLICATIONS

This application is a Continuation of PCT International Application No. PCT/JP2019/006655, filed on Feb. 21, 2019, which is hereby expressly incorporated by reference into the present application.

TECHNICAL FIELD

The present invention relates to a technique for extracting a difference between two programs.

BACKGROUND ART

Project management of FA (Factory Automation) engineering software will be described below.

Usually, an FA device manufacturer uses FA engineering software to generate a project. Then, the FA device manufacturer sets operation to an FA device by writing a program and setting data managed by the project into an FA device. In this way, the FA engineering software manages by a unit of the project, a program to be executed by a CPU (Central Processing Unit) mounted on the FA device, and the setting data such as a parameter to be used by the CPU. That is, the project is a management unit for the program and the setting data. Note that, the FA device is, for example, a programmable controller or display equipment.

In the following descriptions, the "program" and the "setting data" are referred to as "operation setting data" for setting the operation to the FA device. In the following, the "operation setting data" means one of the "program" alone, the "setting data" alone, and both the "program" and the "setting data".

Note that, details of the setting data will be described later.

In order to efficiently perform improvement of the operation of the FA device or defect fixing, there exists a technique for performing comparison between programs before and after editing or between programs whose installing destinations are different.

For example, Patent Literature 1 discloses that in order to efficiently generate a plurality of types of programs from a common source file, constituents extracted from the common source file for each installing destination are compared with each other. Further, Patent Literature 1 discloses that as a result of the comparison, programs for each installing destination are grouped for each common part and also discloses that a range to be debugged is clarified. According to the technique of Patent Literature 1, by such a procedure, it is possible to reduce a burden on debugging work.

CITATION LIST

Patent Literature

Patent Literature 1: JP2002-108652A

SUMMARY OF INVENTION

Technical Problem

Device manufacturers including the FA device manufacturer generates the operation setting data for each of various types of installing destinations. Further, the device manufacturer accumulates the operation setting data generated in the past. However, these pieces of operation setting data have different description contents depending on an operation condition of the device of the installing destination. Further, many pieces of similar operation setting data exist. Therefore, it is difficult to recognize a difference between pieces of existing operation setting data and a common part between the pieces of existing operation setting data, and the operation setting data is not well organized. A technique of Patent Literature 1 is capable of efficiently generating a new program, but not capable of comparing the pieces of existing operation setting data with each other and efficiently organizing the pieces of existing operation setting data.

Further, when comparison between the pieces of operation setting data is performed, the engineering software (for example, FA engineering software) used to generate the project is started, and a collation function of the engineering software is executed to perform the comparison between the pieces of operation setting data.

However, it requires a lot of time to start the engineering software. Then, after the engineering software is started, the comparison between the pieces of operation setting data is performed. As described above, in a current situation, it requires a lot of time to display to a user, the difference between the pieces of operation setting data.

The present invention mainly aims to solve such a problem. More specifically, the present invention mainly aims to immediately display a difference between pieces of operation setting data when a user requests.

Solution to Problem

An information processing apparatus according to the present invention includes:
  a difference extraction section to extract a difference between two pieces of operation setting data which are pieces of data each of which is for setting operation in a device, and generate difference information indicating the extracted difference, before a user requests;
  a difference information storing section to store in an arbitrary storage device, the difference information generated by the difference extraction section; and
  a request response section to acquire the difference information from the storage device and output the acquired difference information to an arbitrary display device when the user requests.

Advantageous Effects of Invention

According to the present invention, it is possible to immediately display a difference between pieces of operation setting data, when a user requests.

BRIEF DESCRIPTION OF DRAWINGS

FIG. 10 is a diagram illustrating examples of matching rates according to the second embodiment;

FIG. 11 is a diagram illustrating an example of a collation order according to the second embodiment;

FIG. 13 is a diagram illustrating an example of screen design data according to the first embodiment.

DESCRIPTION OF EMBODIMENTS

Figure 1:
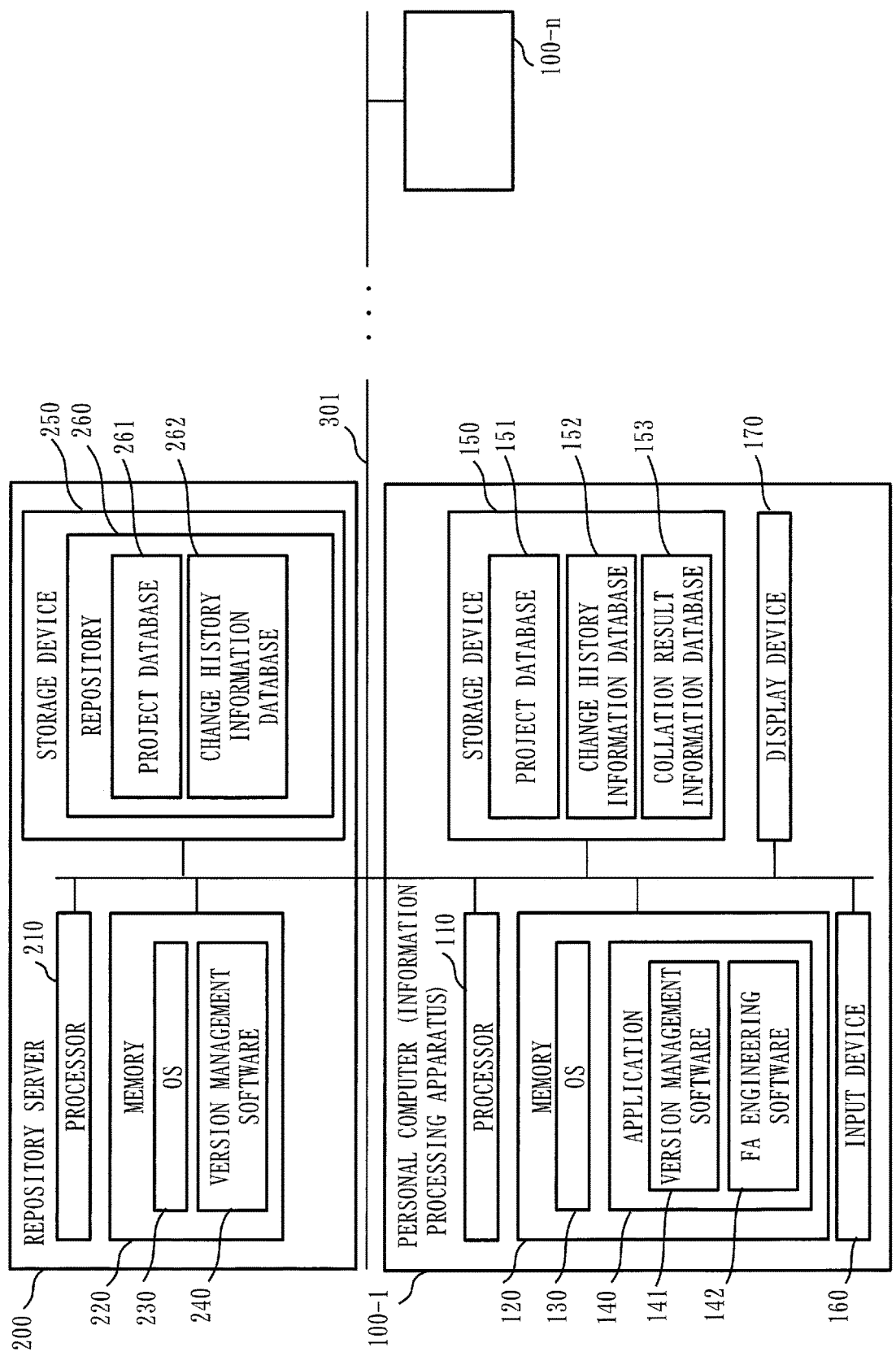
FIG. 1 is a diagram illustrating a system configuration example according to a first embodiment.

Hereinafter, embodiments of the present invention will be described with reference to the drawings. In the following description of the embodiments and the drawings, parts with the same reference numerals indicate the same or corresponding parts.

First Embodiment

In the present embodiment, a configuration will be described with which a difference between pieces of operation setting data can be immediately displayed when a user requests. More specifically, in the present embodiment, before the user requests, the difference between the pieces of operation setting data is collated in advance, and collation result information indicating the difference between the pieces of operation setting data is stored in an arbitrary storage device. Then, when the user requests, the collation result information is acquired from the storage device, and the acquired collation result information is output to an arbitrary display device. Note that, in the following descriptions, "collation" and "comparison" are the same meaning.

Further, in the following, a configuration will be described in which a difference between the "programs" among the pieces of "operation setting data" is collated in advance, and the collation result information indicating the difference between the "programs" is stored in the arbitrary storage device.

DESCRIPTION OF CONFIGURATION

FIG. 1 illustrates a system configuration example according to the present embodiment.

In the present embodiment, as illustrated in FIG. 1, a system is assumed in which a plurality of personal computers 100 are connected to a repository server 200 via a network 301. The network 301 is, for example, Ethernet (registered trademark).

Note that, when it is necessary to distinguish individual personal computers 100, a suffix is added as a personal computer 100-1 to distinguish the individual personal computers 100. When it is unnecessary to distinguish the individual personal computers 100, those are simply written as the personal computer 100.

FIG. 1 illustrates a hardware configuration example of the repository server 200 and a hardware configuration example of the personal computer 100-1. A hardware configuration example of the personal computer 100 other than the personal computer 100-1 is the same as that illustrated in FIG. 1. Further, the following descriptions of the personal computer 100-1 are also applied to the other personal computers 100.

The repository server 200 is configured with a processor 210, a memory 220, and a storage device 250.

The processor 210 executes an OS (Operating System) 230 and version management software 240 which are held in the memory 220. The version management software 240 generates a repository 260 in the storage device 250.

The repository 260 includes a project database 261 and a change history information database 262.

The project database 261 stores project information and a program used in the project. Details of the project are described in the project information.

The change history information database 262 stores change history information of the program used in the project. The change history information indicates a history of changes on the program used in the project.

Registration for the project database 261 and the change history information database 262 is performed by each of the personal computers 100.

The memory 220 holds the OS 230 and the version management software 240 which are loaded from the storage device 250.

The processor 210 is, for example, a CPU. The memory 220 is, for example, a RAM (Random Access Memory). The storage device 250 is, for example, an HDD (Hard Disk Drive), an SSD (Solid State Drive), or the like.

Note that, the collation result information database may exist in the repository server 200. The collation result information database stores the collation result information. The collation result information indicates a collation result between the pieces of operation setting data.

Existence of the collation result information database enables accessing the repository server 200 from the personal computer 100-1 and retrieving desired collation result information at an arbitrary timing. Note that, it is assumed that registration of the collation result information for the collation result information database is performed in a certain cycle.

The personal computer 100-1 is an example of an information processing apparatus. Further, operation performed by the personal computer 100-1 is an example of an information processing method.

The personal computer 100-1 is configured with a processor 110, a memory 120, a storage device 150, an input device 160, and a display device 170.

The processor 110 executes an OS 130 and an application 140 held in the memory 120. By the processor 110 executing the OS 130, task management, memory management, file management, communication control, and the like are performed.

The application 140 includes version management software 141 and FA engineering software 142. The version management software 141 and the FA engineering software 142 are examples of an information processing program.

The memory 120 holds the OS 130, the version management software 141, and the FA engineering software 142 loaded from the storage device 150.

The storage device 150 includes a project database 151, a change history information database 152, and a collation result information database 153.

The collation result information database 153 stores the collation result information. The collation result information indicates the collation result between the pieces of operation setting data.

The input device 160 acquires a request or an instruction from the user of the personal computer 100-1.

The display device 170 displays an execution result of the processor 110, and the like.

The processor 110 is, for example, a CPU. The memory 120 is, for example, a RAM. The storage device 150 is, for example, an HDD, an SSD, or the like. The input device 160 is, for example, a mouse, a keyboard, or the like. The display device 170 is, for example, a display or the like.

The FA engineering software 142 generates and changes the project. More specifically, the FA engineering software 142 generates and changes the programs used in the project. Further, the FA engineering software 142 performs collation between programs.

The version management software 141 generates the change history information along with the generation and change of the project. Further, the version management software 141 stores the generated change history information in the change history information database 152. The change history information indicates the history of changes on the program used in the project.

Further, the version management software 141 displays the collation result on the display device 170 by using the collation result information. The collation result information indicates the collation result between programs.

Further, the version management software 141 registers the program, the project information, the change history information, and the collation result information in the repository 260. Further, the version management software 141 acquires the program, the project information, the change history information, and the collation result information from the repository 260.

Figure 2:
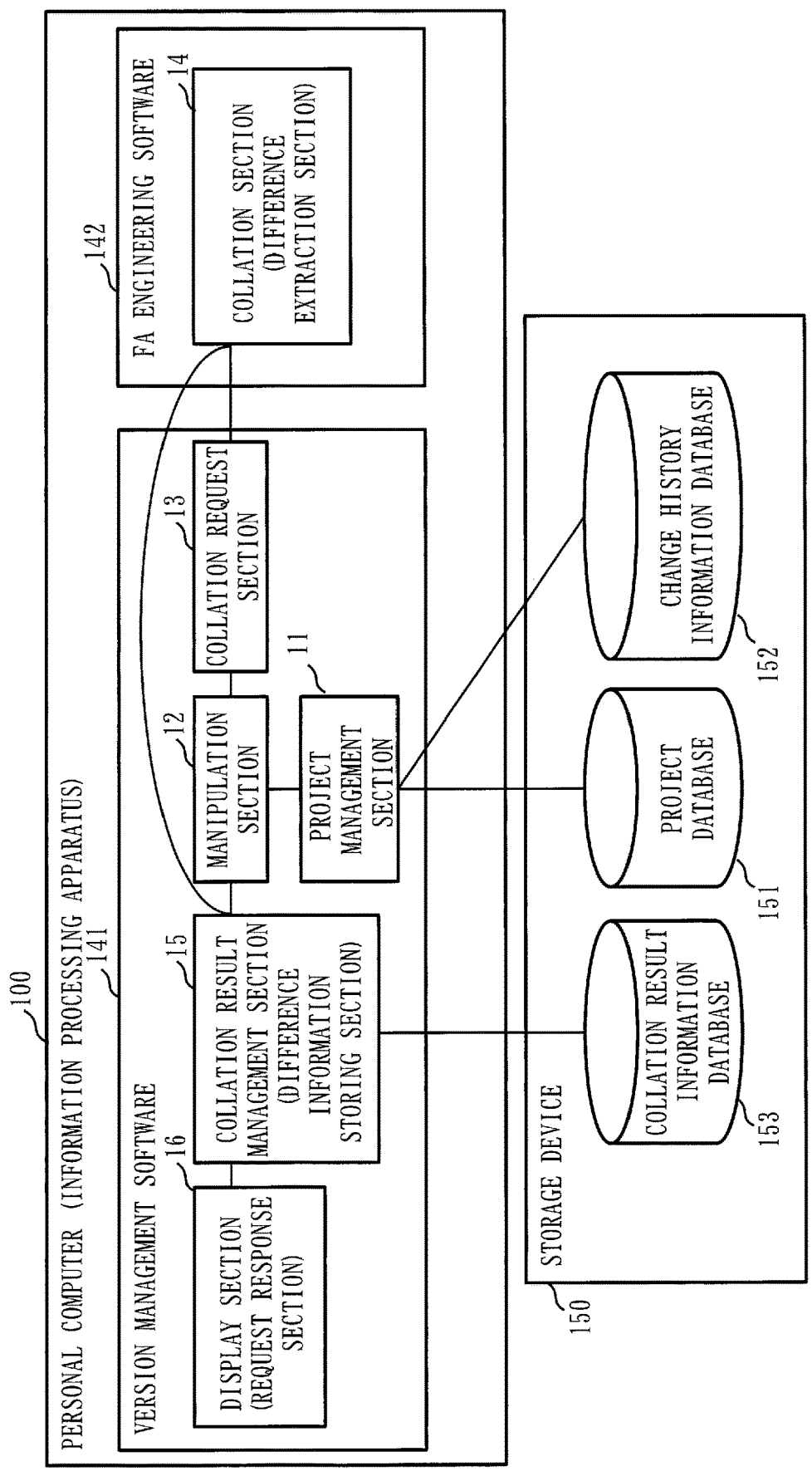
FIG. 2 is a diagram illustrating a functional configuration example of a personal computer according to the first embodiment.

FIG. 2 illustrates a functional configuration example of the personal computer 100.

That is, FIG. 2 illustrates details of the version management software 141 and the FA engineering software 142 illustrated in FIG. 1.

The version management software 141 includes a project management section 11, a manipulation section 12, a collation request section 13, a collation result management section 15, and a display section 16.

The FA engineering software 142 has a collation section 14.

The collation section 14 is an example of a difference extraction section. A process performed by the collation section 14 is an example of a difference extraction process. The collation result management section 15 is an example of a difference information storing section. A process performed by the collation result management section 15 is an example of a difference information storing process. The display section 16 is an example of a request response section. A process performed by the display section 16 is an example of a request response process.

The project management section 11 registers the program and the project information in the project database 151 at a time of new registration of the project. Further, the project management section 11 registers the change history information in the change history information database 152 at the time of the new registration of the project. Further, the project management section 11 updates the change history information in such a manner that the change is reflected when a change occurs on the project, that is, when the change occurs on the program. Further, the project management section 11 registers the change history information after the update in the change history information database 152. Furthermore, the project management section 11 acquires the program and the change history information from the storage device 150.

The manipulation section 12 acquires two programs of two projects which are collation subjects, from the project database 151 via the project management section 11. That is, the manipulation section 12 acquires the two programs from the project database 151. Then, the manipulation section 12 outputs the two acquired programs to the collation request section 13.

For example, the manipulation section 12 acquires a derivation source program and a derivation destination program. Further, the manipulation section 12 acquires, for example, two programs in which a common code block is used. Further, the manipulation section 12 acquires, for example, two programs whose installing destinations are in common. For example, the user of the personal computer 100 can arbitrarily decide what kind of program the manipulation section 12 acquires.

Further, when collation between the program and revision described later is performed, the manipulation section 12 acquires the program which is the collation subject from the project database 151 via the project management section 11, and acquires the change history information from the change history information database 152. Then, the manipulation section 12 outputs to the collation request section 13, the program which is the collation subject and the change history information.

The collation request section 13 outputs the two acquired programs, or the acquired program and the change history information to the collation section 14, and requests the collation section 14 for an inquiry between projects, that is, an inquiry between programs.

The collation section 14 performs collation between the projects. That is, when the collation section 14 acquires two programs from the collation request section 13, the collation section 14 compares the acquired two programs with each other and extracts a difference between the two programs.

Further, when the program and the change history information are acquired from the collation request section 13, that is, when the collation between a program and the revision is performed, the collation section 14 compares the program with the change history information and extracts a difference between the program obtained from the change history information and the acquired program.

The revision is a change event for a program. The change history information indicates a change that has occurred on the program. A case is assumed in which a change s, a change t, and a change u are performed on a program x to obtain a program y. In this case, the change history information indicates the change s, the change t, and the change u. The collation section 14 compares the program x with the change s, the change t, and the change u indicated in the change history information, and extracts a difference between the program x and the program y which is obtained by performing the change s, the change t, and the change u on the program x.

Then, the collation section 14 generates the collation result information indicating the extracted difference. The collation section 14 includes a name of the program which is the collation subject, in the collation result information. Further, when the collation section 14 collates the program with the revision, the collation section 14 also includes a revision number in the collation result information.

The collation section 14 outputs the generated collation result information to the collation result management section 15.

The collation result management section 15 stores in the collation result information database 153, the collation result information acquired from the collation section 14.

Further, the collation result management section 15 acquires the collation result information from the collation result information database 153.

When the user of the personal computer 100 requests, the display section 16 acquires the collation result information from the storage device 150 via the collation result management section 15. Then, the display section 16 outputs the acquired collation result information to the display device 170.

DESCRIPTION OF OPERATION

Next, an operation example of the personal computer 100 according to the present embodiment will be described.

Figure 3:
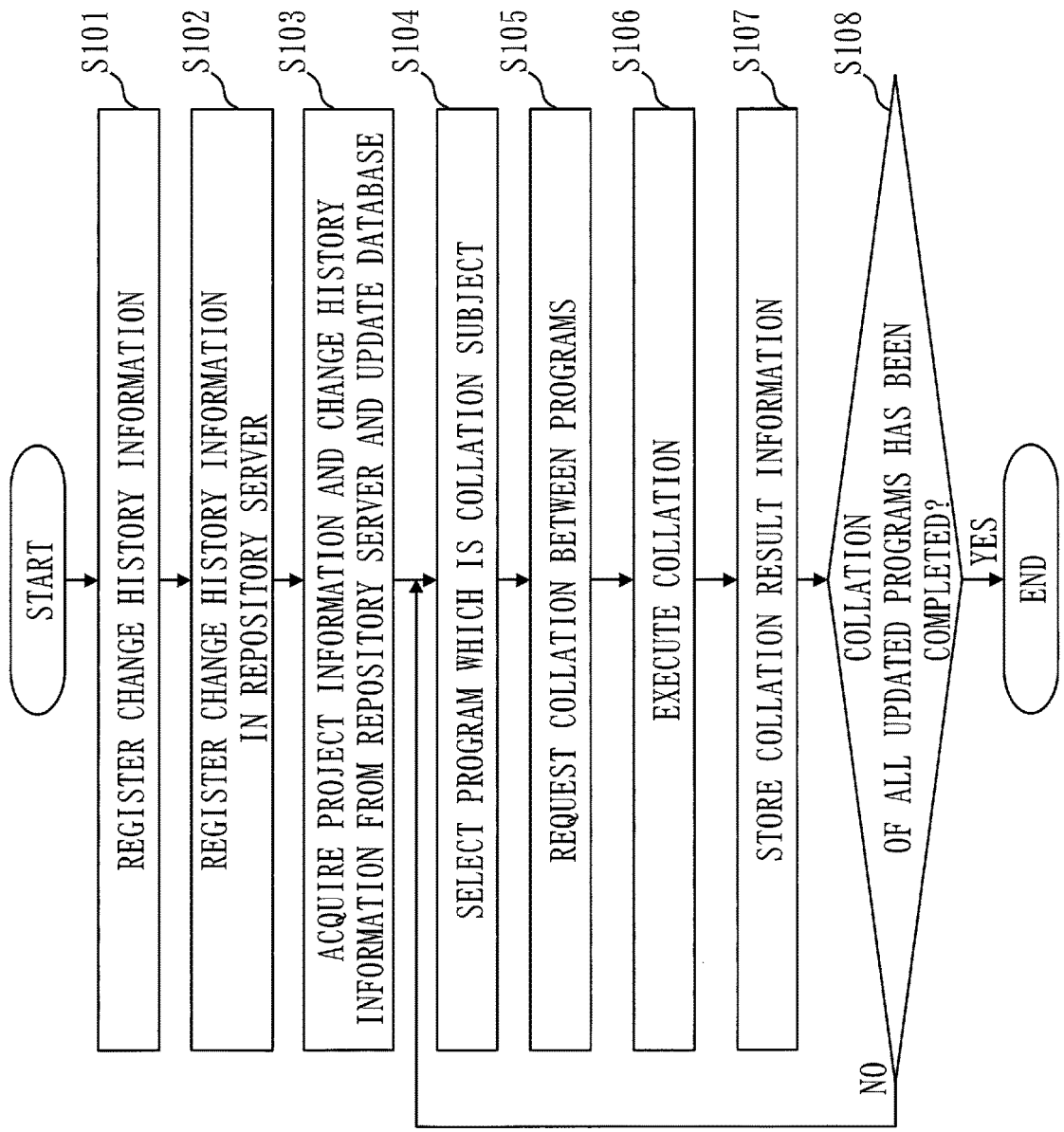
FIG. 3 is a flowchart illustrating an operation example of the personal computer according to the first embodiment.

First, an operation example of the personal computer 100 when saving the collation result information will be described with reference to a flowchart in FIG. 3.

The project management section 11 registers the change history information of the project in the change history information database 152, either when a project is newly registered in the project database 151 (when a program and program information are newly registered in the project database 151) or when a change occurs on the registered project (when a change occurs on the registered program) (step S101).

Note that, when a project is newly registered, the project management section 11 also registers the program and the project information in the project database 151.

Next, the project management section 11 registers the change history information registered in step S101 in the repository server 200 (step S102).

Note that, if the project is newly registered in step S101, the project management section 11 registers also the project information and the program in the repository server 200.

Next, the project management section 11 acquires the project information and the change history information of the other personal computer 100 from the repository server 200, and updates the project database 151 and the change history information database 152 (step S103).

More specifically, the project management section 11 registers in the project database 151, the project information of the other personal computer 100 acquired from the repository server 200, and updates the project database 151. Further, the project management section 11 registers in the change history information database 152, the change history information of the other personal computer 100 acquired from the repository server 200, and updates the change history information database 152. Further, if there is a program of another personal computer 100 newly registered in the repository server 200, the project management section 11 acquires the program from the repository server 200, and registers the acquired program in the project database 151. By performing step S103, the project management section 11 can reflect on the project database 151 and the change history information database 152, the generation of the program and the change on the program in the other personal computer 100.

The project management section 11 performs step S103 in a fixed cycle such as every minute, every hour, and every day. Alternatively, the project management section 11 may perform step S103 when requested by the user at an arbitrary timing.

If there is update of data and if the version management software 141 can generate a branch from the revision, when change occurs on the derivation source program managed by the branch, it is acceptable to generate a new revision by setting the program of the deviation source and the program of the deviation destination as the collation subjects and horizontally expanding the same change as that on the program of the deviation source on the program of the deviation destination.

Next, the manipulation section 12 selects the program which is the collation subject (step S104).

The manipulation section 12 selects two programs which are the collation subjects. The manipulation section 12 may select two programs of two projects, or may select a program before the revision of one project and a program after the revision of the one project. The manipulation section 12 can select the programs which are the collation subjects by an arbitrary method.

Figure 4:
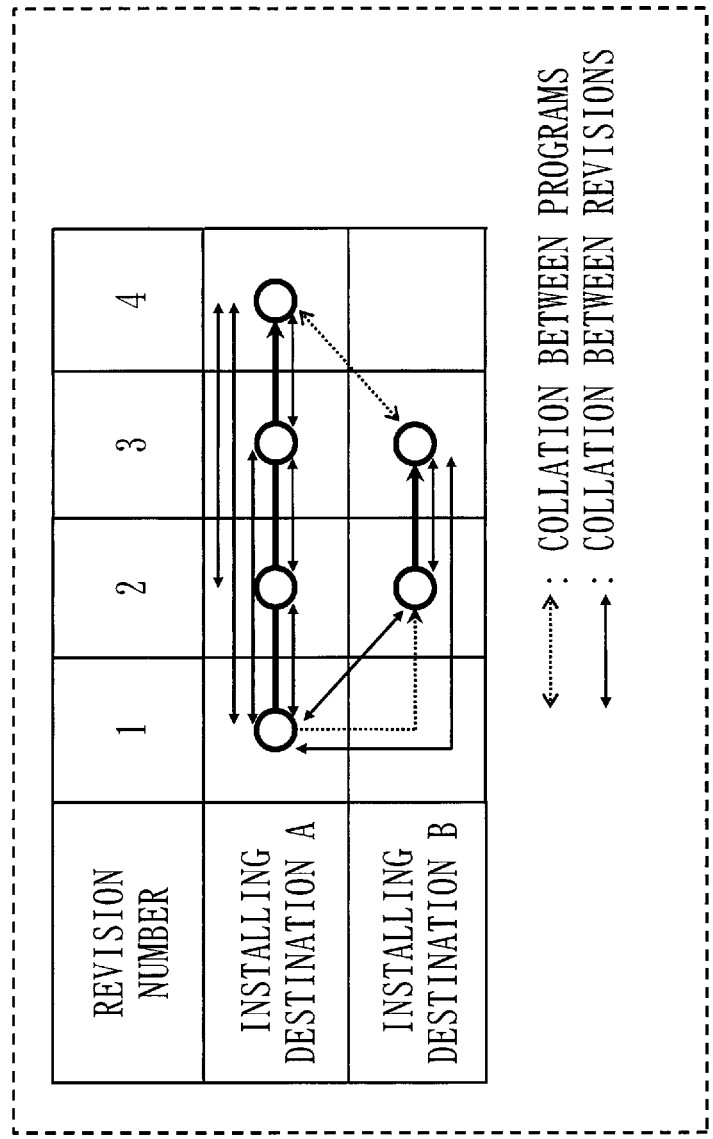
FIG. 4 is a diagram illustrating selection examples of programs according to the first embodiment.

FIG. 4 illustrates selection examples of programs by the manipulation section 12 in step S104.

In FIG. 4, there exist two projects which are a project for an installing destination A and a project for an installing destination B. In the project for the installing destination A, a program is newly generated at a revision number 1. The program generated at the revision number 1 is hereinafter referred to as an original program. Then, in the project for the installing destination A, changes at a revision number 2, a revision number 3, and a revision number 4 occur on the original program. In the project for the installing destination B, changes at the revision number 2 and the revision number 3 occur on the original program. Different changes occur at the revision number 2 of the project for the installing destination A and the revision number 2 of the project for the installing destination B. Similarly, different changes occur at the revision number 3 of the project for the installing destination A and at the revision number 3 of the project for the installing destination B.

In step S104, the manipulation section 12 can select as subjects for the collation between the programs, a program after the change at the revision number 4 of the project for the installing destination A and a program after the change at the revision number 3 of the project for the installing destination B, as illustrated by a dashed arrow in FIG. 4. Further, in step S104, the manipulation section 12 can select a program before the revision and a program after the revision as subjects for the collation between the revisions. For example, the manipulation section 12 can select the original program and the program after the change at the revision number 2 of the project for the installing destination A, as illustrated by a solid arrow in FIG. 4. The manipulation section 12 selects all combinations of revisions belonging to the same project.

Further, the manipulation section 12 acquires a program and change history information corresponding to the selection in step S104 from the project database 151 and the change history information database 152 via the project management section 11.

In the collation between the revisions in FIG. 4, the manipulation section 12 acquires from the project database 151, the original program and the change history information of the project for the installing destination A.

In the collation between the programs in FIG. 4, since the original program is in common, the manipulation section 12 acquires the original program from the project database 151, and also acquires the change history information of the project for the installing destination A and the change history information of the project for the installing destination B from the change history information database 152.

Then, the manipulation section 12 outputs to the collation request section 13, the program and the change history information acquired from the project management section 11.

Next, the collation request section 13 requests the collation section 14 for the collation (step S105).

When the collation request section 13 acquires one program and one piece of change history information from the manipulation section 12, the collation request section 13 requests the collation section 14 for the collation between the revisions exemplified in FIG. 4.

Further, when the collation request section 13 acquires one program and two pieces of change history information from the manipulation section 12, the collation request section 13 requests the collation section 14 for the collation between the programs exemplified in FIG. 4.

Next, the collation section 14 executes the collation requested by the collation request section 13 (step S106). Then, the collation section 14 generates the collation result information indicating the collation result. Since the collation result information indicates the difference between the two programs which are the collation subjects, the collation result information is equivalent to difference information.

The collation section 14 includes the name of the program and the revision number in the collation result information. The collation section 14 extracts, for example, the name of the program from the acquired program or change history information. Further, the collation section 14 extracts, for example, the revision number from the acquired change history information.

The collation section 14 outputs the generated collation result information to the collation result management section 15.

Note that, the collation section 14 can generate the collation result information in an arbitrary format. The collation section 14 can generate, for example, the collation result information as an image file. For example, if the collation section 14 generates the collation result information as the image file, the display section 16 can display the collation result at high speed. Further, if the collation section 14 generates the collation result information as an image file of a JPEG format, the name of the program and the revision number can be treated as tag information.

Next, the collation result management section 15 acquires the collation result information from the collation section 14, and stores the acquired collation result information in the collation result information database 153 (step S107).

Finally, the project management section 11 determines whether or not the collation has been completed for all the programs generated or updated in the personal computer 100 (step S108). If the collation has not been completed for all the programs (NO in step S108), the processes from step S104 to step S107 are performed again. On the other hand, when the collation has been completed for all the programs (YES in step S108), the process ends.

Note that, when the collation has been completed for all the programs, the display section 16 may notify the user that the collation has been completed by displaying a completion notification on the display device 170. By doing so, the user can refer to the collation result information early.

For example, it is assumed that a program i, a program j, and a program k are generated in the personal computer 100. The collation section 14 collates the program i with the program j, and extracts a difference between the program i and the program j. Further, the collation section 14 collates the program i with the program k, and extracts a difference between the program i and the program k. Further, the collation section 14 collates the program j with the program k, and extracts a difference between the program j and the program k. Then, the project management section 11 stores in the collation result information database 153, the collation result information indicating the difference between the program i and the program j, the collation result information indicating the difference between the program i and the program k, and the collation result information indicating the difference between the program j and the program k.

As described above, in the present embodiment, by performing the collation between the programs in all combinations, it is possible to obtain the collation result information for all the combinations of programs before the user requests.

Next, an operation example of the personal computer 100 when displaying the collation result will be described.

The user of the personal computer 100 selects one to be executed out of the collation between the programs and the collation between the revisions, by using the input device 160.

Figure 6:
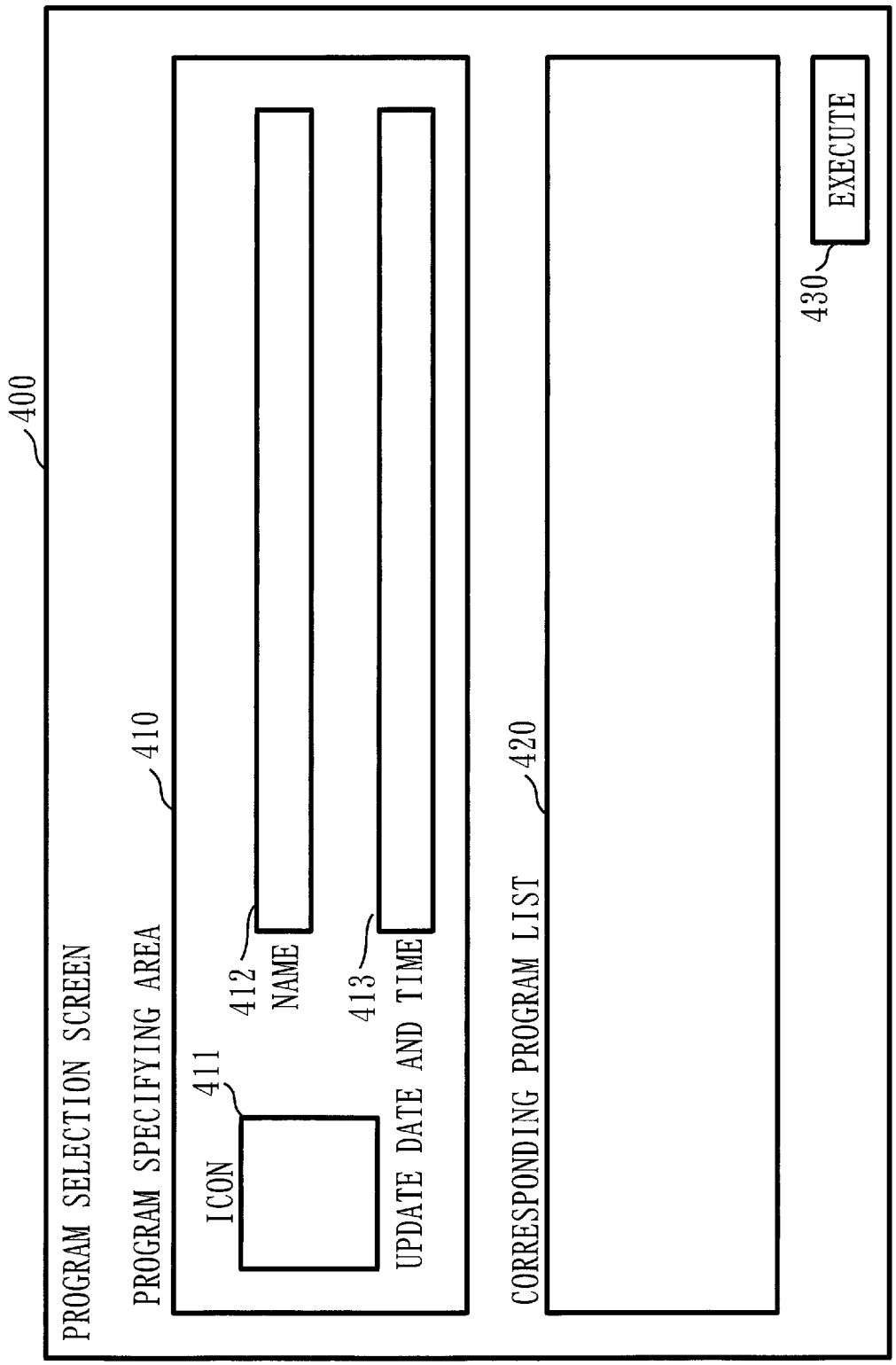
FIG. 6 is a diagram illustrating an example of a program selection screen according to the first embodiment.
Figure 7:
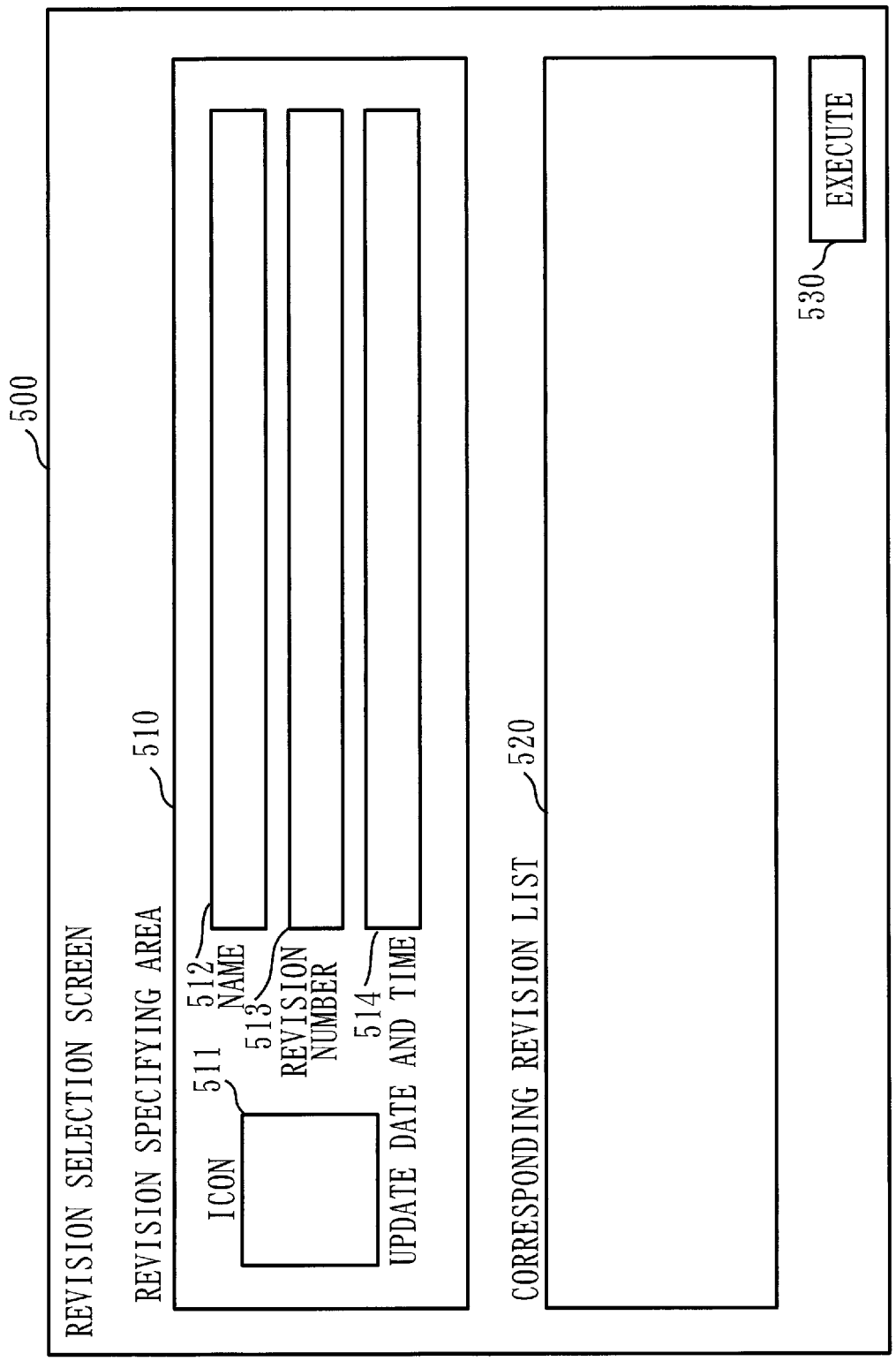
FIG. 7 is a diagram illustrating an example of a revision selection screen according to the first embodiment.

When the user selects the former, the display section 16 displays a program selection screen on the display device 170. On the other hand, when the user selects the latter, the display section 16 displays a revision selection screen on the display device 170. FIG. 6 illustrates an example of the program selection screen. FIG. 7 illustrates an example of the revision selection screen.

When the program selection screen is displayed, the user specifies one of the programs which are the collation subjects in a program specifying area 410 of the program selection screen. Specifically, the user can specify one of the programs which are the collation subjects, by inputting into a name 412 of the program specifying area 410, a name of one of the programs which are the collation subjects. After inputting into the name 412, the user presses an execute button 430. Further, the user can specify one of the programs which are the collation subjects in more detail by inputting date and time into update date and time 413. Note that, when the name of the program is input into the name 412, an icon of the program is displayed on an icon 411.

When the user presses the execute button 430, a list of names of programs in a correspondence relation with the program specified by the user is displayed in a corresponding program list 420. The user can select the other one of the programs which are the collation subjects, by, for example, clicking by a mouse, a name of an arbitrary program from among the names of the programs displayed in the corresponding program list 420. The user can select names of a plurality of programs. When the user presses the execute button 430 after selecting the other one of the programs which are the collation subjects, the collation result is displayed.

Note that, the program displayed in the corresponding program list 420 may be limited by a range of the update date and time of the program or a condition unique to the FA engineering software so that the user can easily select the other one of the programs which are the collation subjects. If the FA engineering software is software for generating a sequence program, it is possible to put a limitation that a project whose number of POUs (Program Organization Units) are equal to or smaller than a specified number is not displayed in the corresponding program list 420, and so on, as a limitation by the condition unique to the FA engineering software.

On the other hand, when the revision selection screen is displayed, the user specifies one of the revisions which are the collation subjects in a revision specifying area 510 of the revision selection screen. Specifically, the user can specify one of the revisions which are the collation subjects, by inputting into a name 512 of the revision specifying area 510, the name of the program which is the collation subject, and inputting the corresponding revision number into a revision number 513. After inputting into the name 512 and the revision number 513, the user presses an execute button 530. Further, the user can specify one of the revisions which are the collation subjects in more detail by inputting date and time into update date and time 514. Note that, when the name of the program is input into the name 512, an icon of the program is displayed on an icon 511.

When the user presses the execute button 530, a list of revision numbers of revisions in a correspondence relation with the revision specified by the user is displayed in a corresponding revision list 520. The user can select the other one of the revisions which are the collation subjects by, for example, clicking by a mouse, an arbitrary revision number from among the revision numbers displayed in the corresponding revision list 520. The user can select a plurality of revision numbers. When the user presses the execute button 530 after selecting the other one of the revisions which are the collation subjects, the collation result is displayed.

In addition to the revision number, the update date and time, comment, and the like may be displayed in the corresponding revision list 520.

Figure 5:
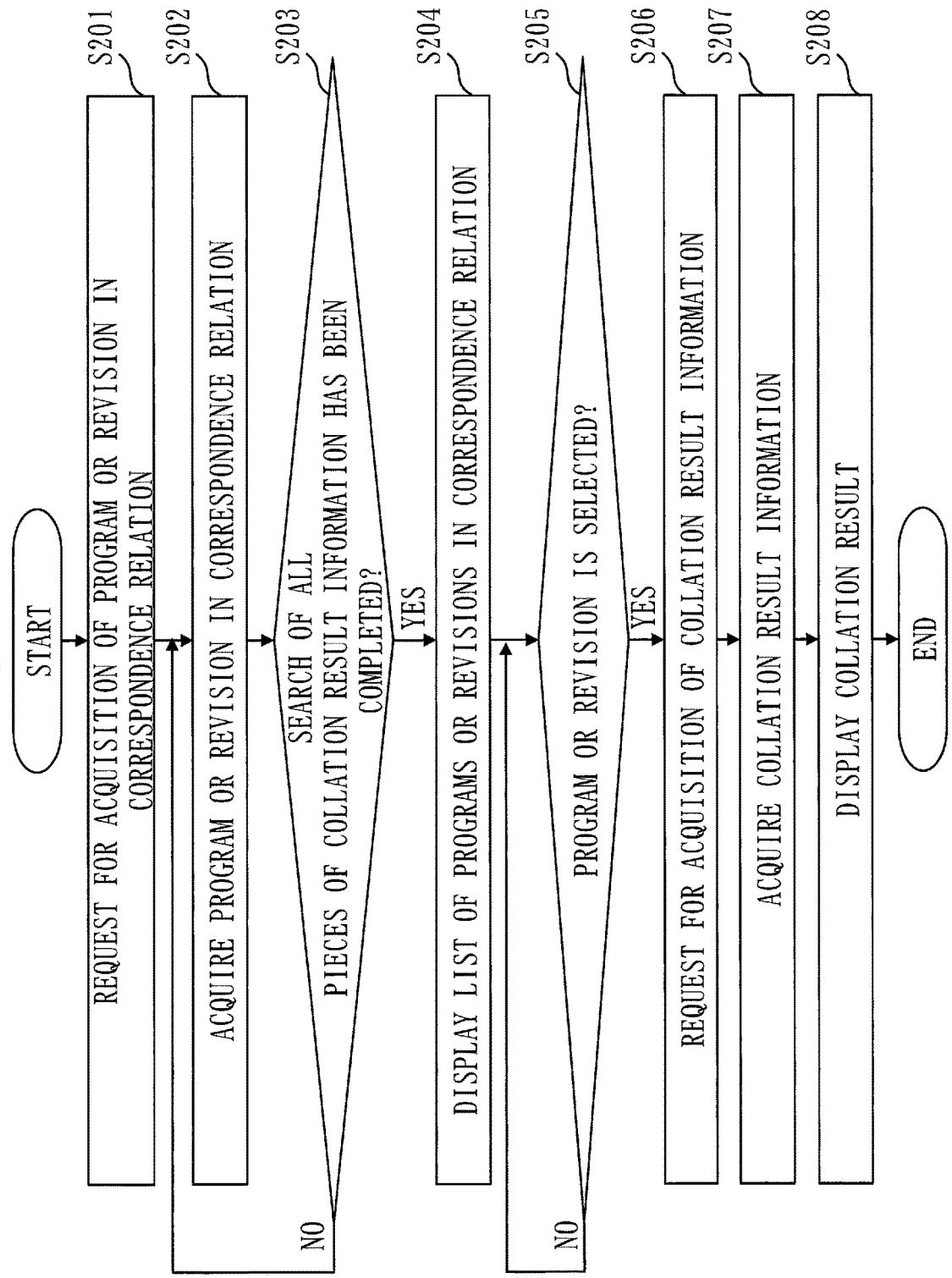
FIG. 5 is a flowchart illustrating an operation example of the personal computer according to the first embodiment.

FIG. 5 illustrates an operation example of the personal computer 100 after the user specifies one of the programs which are the collation subjects or one of the revisions which are the collation subjects.

Hereinafter, operation of the personal computer 100 will be described with reference to FIG. 5.

When the user specifies one of the programs which are the collation subjects in the program specifying area 410 of the program selection screen or when the user specifies one of the revisions which are the collation subjects in the revision specifying area 510 of the revision selection screen, the display section 16 requests the collation result management section 15 for acquisition of the program or the revision in the correspondence relation (step S201).

More specifically, the display section 16 notifies the collation result management section 15 of the name of the program specified by the name 412 of the program specifying area 410, and requests the collation result management section 15 for the acquisition of the program in the correspondence relation with the program.

Further, the display section 16 notifies the collation result management section 15 of the name of the program specified in the name 512 of the revision specifying area 510 and the revision number specified in the revision number 513, and requests the collation result management section 15 for the acquisition of the revision in the correspondence relation with the revision of the program.

Next, the collation result management section 15 acquires the program or revision in the correspondence relation (step S202).

Specifically, when the collation result management section 15 acquires the name of the program from the display section 16, the collation result management section 15 extracts the collation result information describing the name of the program acquired from the display section 16 from the collation result information accumulated in the collation result information database 153. Then, the collation result management section 15 extracts the name of the other program described in the extracted collation result information. Note that, the collation result management section 15 stores in the cache memory or the like, the extracted collation result information describing the name of the program acquired from the display section 16.

On the other hand, when the collation result management section 15 acquires the name of the program and the revision number from the display section 16, the collation result management section 15 extracts the collation result information describing the name of the program and the revision number acquired from the display section 16, from the collation result information accumulated in the collation result information database 153. Then, the collation result management section 15 extracts the revision number described in the extracted collation result information, which is other than the revision number acquired from the display section 16. Note that, the collation result management section 15 stores in the cache memory or the like, the extracted collation result information describing the name of the program and the revision number acquired from the display section 16.

Next, the display section 16 determines whether or not the process of step S202 has been completed for all the collation result information in the collation result information database 153 (step S203).

When the process of step S202 has been completed for all the collation result information in the collation result information database 153 (YES in step S203), the name of the program or the revision number extracted by the collation result management section 15 in step S202 is output to the display section 16. After that, the process proceeds to step S204. On the other hand, when the process of step S202 has not been completed for all the collation result information in the collation result information database 153 (NO in step S203), the process of step S202 is performed.

If step S203 is YES, the display section 16 displays on the display device 170, a list of the names of the programs or a list of the revision numbers acquired from the collation result management section 15 (step S204).

When the display section 16 acquires the name of the program from the collation result management section 15, the display section 16 lists the acquired name of the program in the corresponding program list 420 on the program selection screen (FIG. 6).

Further, when the revision number is acquired from the collation result management section 15, the display section 16 lists the acquired revision number in the corresponding revision list 520 of the revision selection screen (FIG. 7).

When one of the names of the programs or one of the revision numbers is selected by the user from the names of the programs or the revision numbers displayed in step S204 (YES in step S205), the display section 16 requests the collation result management section 15 to acquire the collation result information (step S206).

When the name of the program is selected by the user, the display section 16 outputs the name of the program selected by the user to the collation result management section 15. On the other hand, when the revision number is selected by the user, the display section 16 outputs the revision number selected by the user to the collation result management section 15.

Next, the collation result management section 15 acquires the corresponding collation result information from the collation result information database 153 (step S207).

When the name of the program is notified by the display section 16, the collation result management section 15 acquires the collation result information describing the name of the program notified by the display section 16, among the collation result information (the collation result information stored in the cache memory or the like) extracted in step S202.

When the revision number is notified by the display section 16, the collation result management section 15 acquires the collation result information describing the revision number notified by the display section 16, among the collation result information (the collation result information stored in the cache memory or the like) extracted in step S202.

Then, the collation result management section 15 outputs the acquired collation result information to the display section 16.

Next, the display section 16 displays the collation result on the display device 170 based on the collation result information acquired from the collation result management section 15 (step S208).

Figure 8:
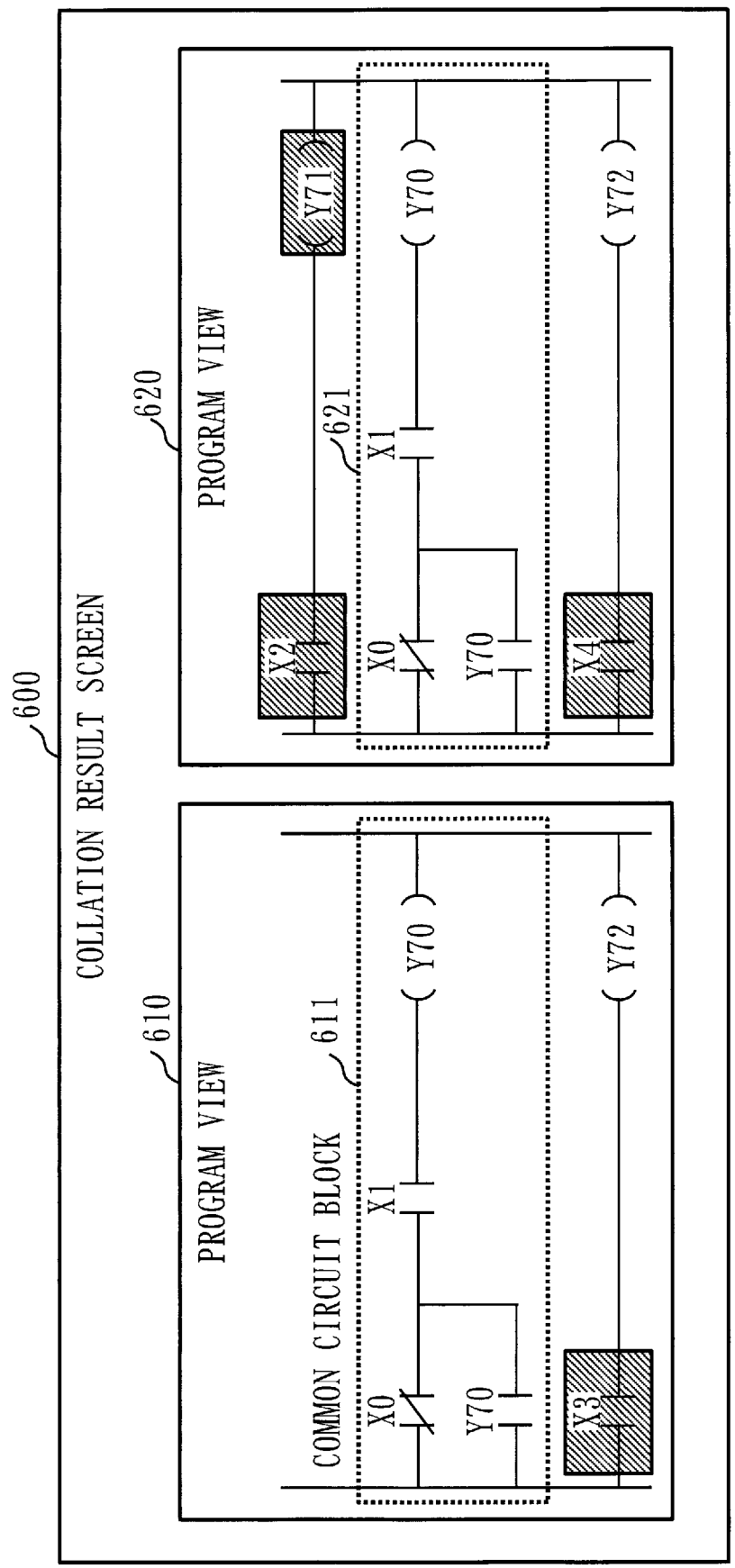
FIG. 8 is a diagram illustrating an example of a collation result screen according to the first embodiment.

FIG. 8 illustrates an example of the collation result screen displayed in step S208.

A collation result screen 600 in FIG. 8 illustrates a collation result screen when the program which is the collation subject is the sequence program.

The collation result screen 600 includes a program view 610 and a program view 620 which allow screen scroll. The sequence program which is the collation subject is indicated in the program view 610 and the program view 620.

The display section 16 displays the program view 610 and the program view 620 horizontally on the collation result screen 600 so that the user can easily recognize the difference between the programs which are the collation subjects. Note that, the display section 16 may display the program view 610 and the program view 620 vertically.

Further, the display section 16 may display the difference between the programs emphasizing the difference by changing colors, as exemplified in FIG. 8. The display section 16 may display the difference between the programs emphasizing the difference, by methods other than a difference in color.

DESCRIPTION OF EFFECT OF EMBODIMENT

In the above, according to the present embodiment, when the user requests, it is possible to immediately display the difference between the programs.

Conventionally, when the programs which are the collation subjects are sequence programs that cannot be expressed in a text format, it has been necessary to start the FA engineering software and execute a calculation requiring a high processing load, for the collation of the sequence programs. Therefore, it has taken a long time for the collation.

In the present embodiment, at a time when a program is newly generated or when there is as change on the program, the collation section 14 performs the collation between the programs. Then, the collation result management section 15 stores the collation result information in the storage device 150. That is, since the collation result information exists in the storage device 150 before the user requests the collation, the display section 16 can display the collation result without taking time, by acquiring the collation result information in the storage device 150 when the user requests the collation.

It enables the user to understand a common part between the programs that the difference between the programs is displayed on the collation result screen 600 with an emphasize on the difference, as exemplified in FIG. 8. In an example in FIG. 8, parts indicated by a reference numeral 611 and a reference numeral 621 are common parts (hereinafter, referred to as common circuit blocks) between the programs. By treating the common circuit block as a component, it is possible to reuse the common circuit block at a time of generating a program afterwards.

After the collation result between the programs as exemplified in FIG. 8 is displayed, the user sometimes wants to know frequency of use of the common circuit block in the other programs. That is, when the common circuit block is often used in the other programs, the user tends to treat the common circuit block as the component and reuse the common circuit block at the time of generating a program afterwards. On the other hand, if the common circuit block is not often used in the other programs, the user does not think of treating the common circuit block as the component. The user sometimes wants to know the frequency of the use of the common block in the other programs in order to consider whether or not to make the common circuit block into the component. In this case, in order to check the frequency of the use of the common part in the other programs, it is necessary to execute collation between the other programs a plurality of times. Conventionally, in such a case, it has been necessary to perform the collation between the other programs each time, and it has taken a long time to obtain the frequency of the use in the other programs.

In the present embodiment, since the collation between the programs is performed in advance, and the collation result information is stored in the storage device 150, the display section 16 can display the collation result without taking time by acquiring the collation result information in the storage device 150. Therefore, the user can check the frequency of the use of the common part in the other programs early, and can pursue reduction in a work load and improvement of work efficiency.

Further, when the collation result is displayed in step S208, the FA engineering software 142 may be started from the collation result screen 600 in order for the user to check or edit details of the programs which are the collation subjects.

In this case, the display section 16 may notify the project management section 11 of the names of the two programs included in the collation result information acquired from the collation result management section 15, and the project management section 11 may acquire programs corresponding to the notified names of the programs from the project database 151. Then, the FA engineering software 142 may start the acquired programs.

Note that, in the above, the process for the "program" in the "operation setting data" has been described.

By reading "program" as "setting data" in the above descriptions, it is possible to apply the above procedure to the "setting data".

Here, details of the "setting data" will be described.

In the below, screen design data for display equipment will be described as an example of the setting data.

Figure 12:
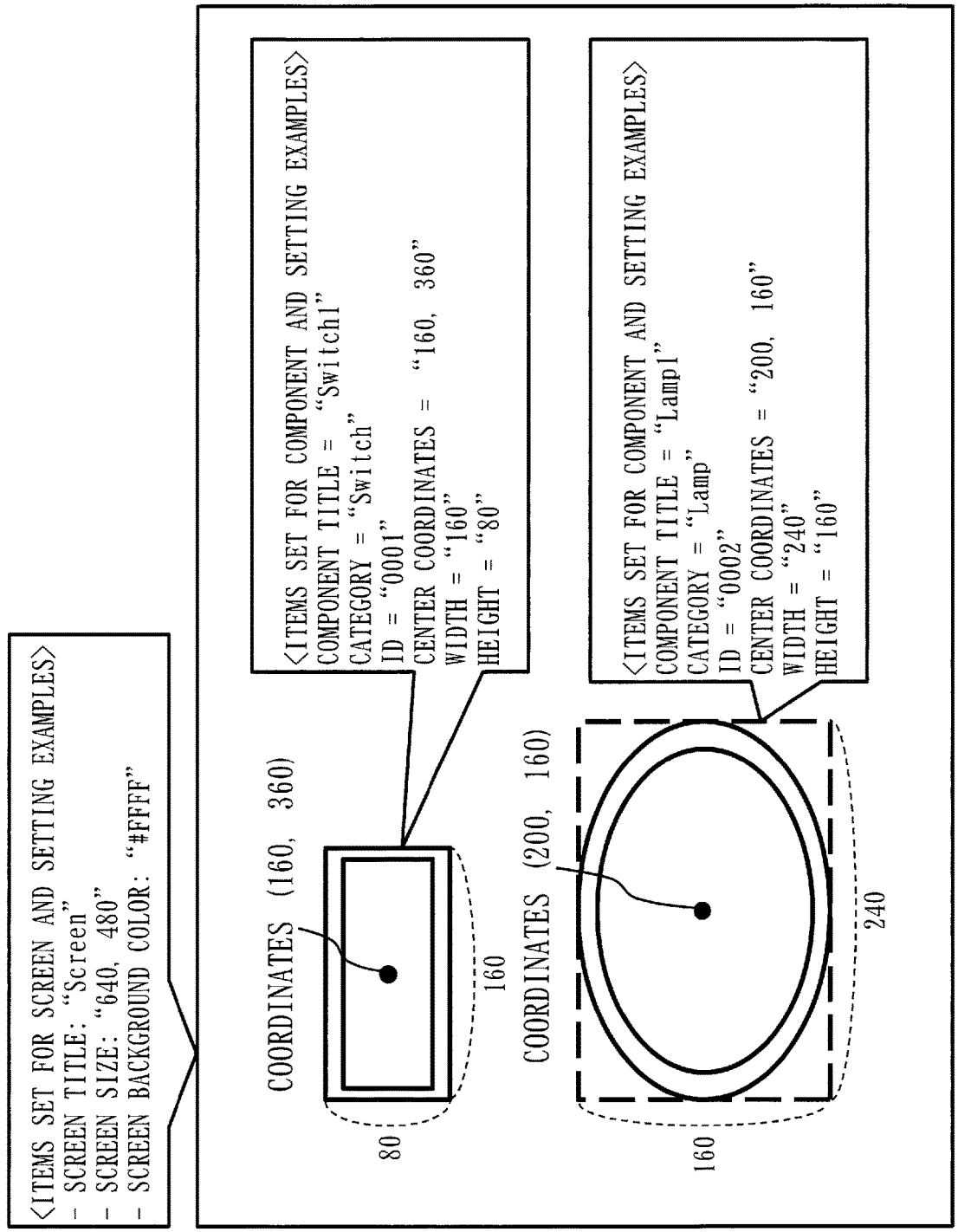
FIG. 12 is a diagram illustrating a screen design example using display equipment engineering software according to the first embodiment.
Figure 14:
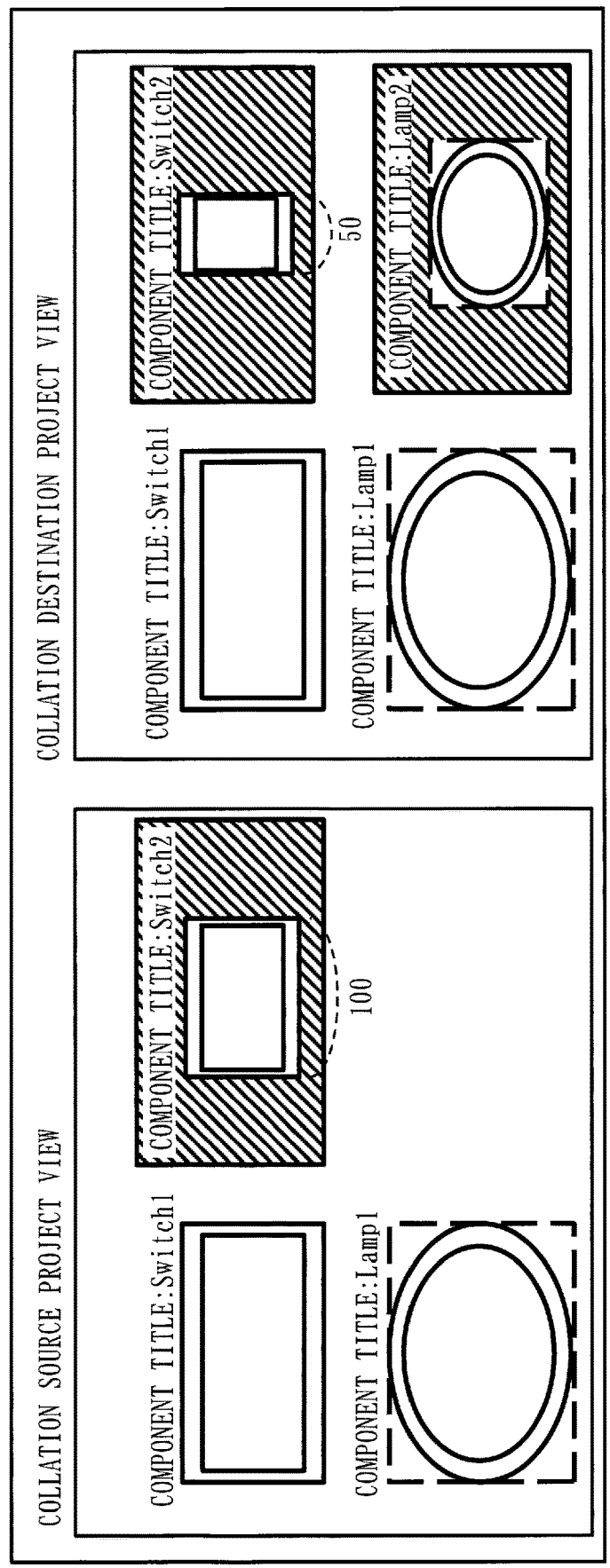
FIG. 14 is a diagram illustrating an example of a collation result screen according to the first embodiment.

When the user uses display equipment engineering software and designs a screen to be displayed on the display equipment as in FIG. 12, for example, the screen design data illustrated in FIG. 13 is assumed. When pieces of the screen design data are collated, the collation section 14 compares the screen design data of a collation source with the screen design data of a collation destination. As a result of the comparison, the collation result screen as in FIG. 14 is displayed. As illustrated in FIG. 14, it is assumed that a part which has a difference between the collation source and the collation destination is emphasized by coloring, as with FIG. 8. For example, Switch 2 has different width (one of items set in the component (described in FIG. 13)) between the collation source and the collation destination. Further, Lamp2 is a component that is not in the collation source but in the collation destination. Therefore, the color of the difference part is changed in the display of each of Switch2 and Lamp2. In FIG. 13, unlike a case in FIG. 8, there is nothing corresponding to the common circuit block.

Note that, although the setting data is generated by the display equipment engineering software, the setting data is owned by the project inside, and the data does not need to be visible to the user (the setting data is merely a collation subject as viewed from the software, and as a result, it is sufficient if the collation result screen as in FIG. 13 can be viewed by the user).

Second Embodiment

Generally, operation of the FA device is controlled by using a plurality of types of software having different purposes such as the PLC (Programmable Logic Controller), engineering software and the display equipment engineering software.

Here, it is assumed that PLC engineering software and the display equipment engineering software unique to the installing destination are prepared for each installing destination of the FA device. For example, when a matching rate is high between pieces of PLC engineering software, the user sometimes wants to recognize whether or not a matching rate is also high between pieces of display equipment engineering software.

In the present embodiment, the collation section 14 computes a matching rate between each of three or more programs. Then, the collation section 14 decides based on the computed matching rates, an extraction order when extracting a difference between each of three or more associated programs that are associated with the three or more programs in a one-to-one manner. Then, the collation section 14 extracts a difference between each of the three or more associated programs according to the decided extraction order.

In examples of the PLC engineering software and the display equipment engineering software described above, the collation section 14 computes a matching rate between each of three or more pieces of PLC engineering software. Then, the collation section 14 decides based on the computed matching rates, an extraction order when extracting a difference between each of three or more pieces of display equipment engineering software associated with the three or more pieces of PLC engineering software in a one-to-one manner. Then, the collation section 14 extracts a difference between each of the three or more pieces of display equipment engineering software according to the decided extraction order. By doing this, the collation result information is generated in an order from a pair of pieces of display equipment engineering software matching rate between which is expected to be high.

Figure 9:
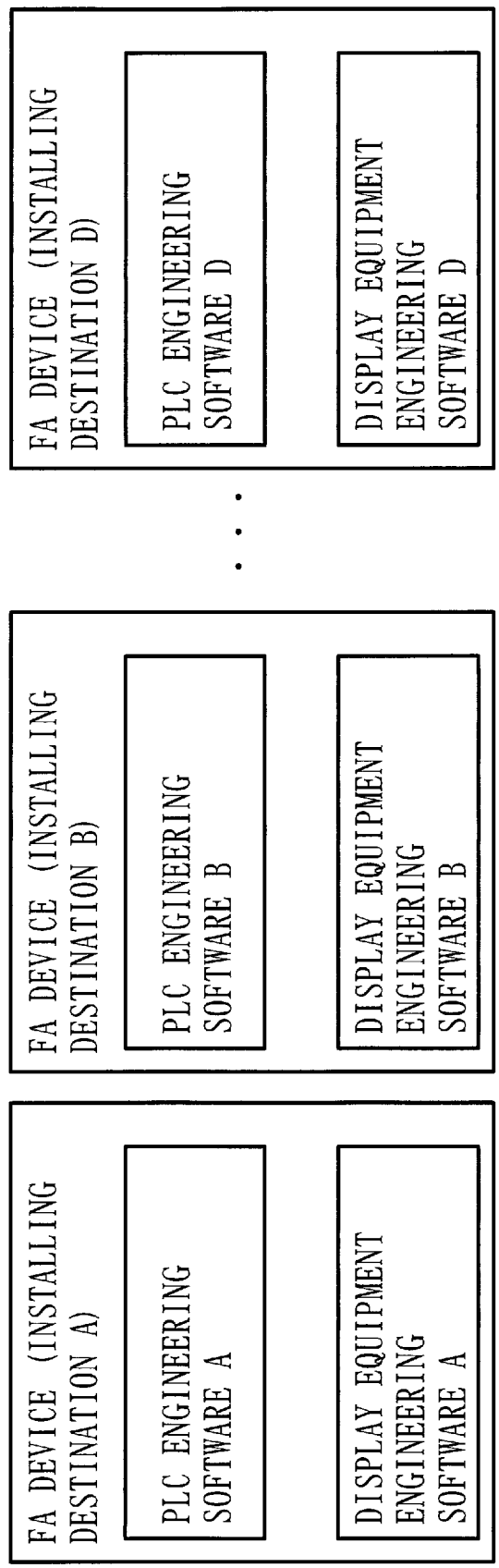
FIG. 9 is a diagram illustrating an example of software for each installing destination according to a second embodiment.

FIG. 9 illustrates the PLC engineering software and the display equipment engineering software implemented on the FA device for each installing destination.

The PLC engineering software A and the display equipment engineering software A are implemented on the FA device of the installing destination A. That is, in the FA device of the installing destination A, the PLC engineering software A and the display equipment engineering software A are associated with each other. Further, on the FA device of the installing destination B, the PLC engineering software B and the display equipment engineering software B are implemented. That is, on the FA device of the installing destination B, the PLC engineering software B and the display equipment engineering software B are associated with each other. Further, on the FA device of the installing destination C, the PLC engineering software C and the display equipment engineering software C are implemented. That is, on the FA device of the installing destination C, the PLC engineering software C and the display equipment engineering software C are associated with each other. Further, on the FA device of the installing destination D, the PLC engineering software D and the display equipment engineering software D are implemented. That is, on the FA device of the installing destination D, the PLC engineering software D and the display equipment engineering software D are associated with each other.

In the present embodiment, the collation section 14 extracts a difference between the PLC engineering software A and the PLC engineering software B, and computes a matching rate between the PLC engineering software A and the PLC engineering software B. Further, the collation section 14 extracts a difference between the PLC engineering software A and the PLC engineering software C, and computes a matching rate between the PLC engineering software A and the PLC engineering software C. Similarly, the collation section 14 extracts a difference between each of four pieces of PLC engineering software, and computes a matching rate between each of the four pieces of PLC engineering software.

FIG. 10 illustrates an example of computation results of the matching rates.

In an example in FIG. 10, the matching rate between the PLC engineering software A and the PLC engineering software B (the installing destination A and the installing destination B) is the highest at 60%. On the other hand, the matching rate between the PLC engineering software C and the PLC engineering software D (the installing destination C and the installing destination D) is the lowest at 10%.

The collation section 14 decides the collation order among the pieces of display equipment engineering software, that is, the extraction order for the difference between the pieces of display equipment engineering software, in a descending order of the matching rates.

In a case of the matching rates in FIG. 10, as illustrated in FIG. 11, the collation section 14 decides an order in which the display equipment engineering software A and the display equipment engineering software B (the installing destination A and the installing destination B) are collated first with each other and the display equipment engineering software C and the display equipment engineering software D (the installing destination C and the installing destination D) are collated last with each other.

As described above, in the present embodiment, the collation section 14 computes the matching rate between the programs (for example, the PLC engineering software), decides a collation order of the associated programs (for example, the display equipment engineering software) based on the computed matching rates, and performs collation between the associated programs according to the decided collation order. Therefore, the collation result information between the associated programs matching rate between which is expected to be high is preferentially generated.

Further, each time the collation result information is generated, the display section 16 may notify the user that the collation result information is generated, by displaying a completion notification on the display device 170. By doing this, the user can early refer to the collation result information between the associated programs matching rate between which is expected to be high.

In this way, without waiting for the completion of the collation of all the associated programs, it is possible to display the collation result information between the associated programs matching rate between which is expected to be high, which the user hopes for. Therefore, it is possible to shorten a time required until the collation result information is displayed, and implement improvement of work efficiency.

In the above, an example has been described in which the collation section 14 decides the collation order of the pieces of display equipment engineering software according to the descending order of the matching rates between the pieces of PLC engineering software. The collation section 14 may decide the collation order of the pieces of display equipment engineering software according to the ascending order of the matching rates between the pieces of PLC engineering software.

Further, in the above, an example has been described in which the collation section 14 decides based on the matching rate of one of the two types of software, the collation order of the other software. The collation section 14 may decide based on the matching rate of one of the three or more types of software, the collation order of the other software.

Further, in the above, an example has been described in which the collation section 14 performs the collation between the pieces of display equipment engineering software corresponding to a combination of pieces of PLC engineering software matching rate between which is low. The collation section 14 does not have to perform the collation between the pieces of display equipment engineering software corresponding to the combination of pieces of PLC engineering software matching rate between which is equal to or smaller than a threshold value.

Note that, in the present embodiment, differences from the first embodiment have been mainly described. Matters not described in the present embodiment are the same as those in the first embodiment.

Although the embodiments of the present invention have been described above, these two embodiments may be combined and implemented.

Alternatively, one of these two embodiments may be partially implemented.

Alternatively, these two embodiments may be partially combined and implemented.

Note that, the present invention is not limited to these embodiments, and various modifications can be made as necessary.

DESCRIPTION OF HARDWARE
CONFIGURATION

Finally, supplementary descriptions of the hardware configuration of the personal computer 100 will be given.

As described above, the processor 110 executes the version management software 141 and the FA engineering software 142. Then, at least one of information, data, a signal value, and a variable value indicating an execution result of the version management software 141 and the FA engineering software 142 is stored in at least one of the memory 120, the storage device 150, and a register and a cache memory in the processor 110.

Further, the version management software 141 and the FA engineering software 142 may be stored in a portable recording medium such as a magnetic disk, a flexible disk, an optical disk, a compact disk, a Blu-ray (registered trademark) disk, or a DVD. Then, the portable recording medium storing the version management software 141 and the FA engineering software 142 may be commercially distributed.

Further, "section" of the project management section 11, the manipulation section 12, the collation request section 13, the collation section 14, the collation result management section 15, and the display section 16 included in the version management software 141 and the FA engineering software 142 may be read as "circuit" or "step" or "procedure" or "process".

Further, the personal computer 100 may be realized by a processing circuit. The processing circuit is, for example, a logic IC (Integrated Circuit), a GA (Gate Array), an ASIC (Application Specific Integrated Circuit), or an FPGA (Field-Programmable Gate Array).

Note that, in the present specification, a superordinate concept of the processor and the processing circuit is referred to as "processing circuitry".

That is, each of the processor and the processing circuit is a specific example of the "processing circuitry".

REFERENCE SIGNS LIST

11: project management section, 12: manipulation section, 13: collation request section, 14: collation section, 15: collation result management section, 16: display section, 100: personal computer, 110: processor, 120: memory, 130: OS, 140: application, 141: version management software, 142: FA engineering software, 150: storage device, 151: project database, 152: change history information database, 153: collation result information database, 160: input device, 170: display device, 200: repository server, 210: processor, 220: memory, 230: OS, 240: version management software, 250: storage device, 260: repository, 261: project database, 262: change history information database, 301: network.

The invention claimed is:

1. An information processing apparatus comprising:
processing circuitry
to extract a difference between each of three or more pieces of operation setting data which are pieces of data each of which is for setting operation in a device by comparing each of the three or more pieces of operation setting data, compute a matching rate between each of the three or more pieces of operation setting data, decide based on computed matching rates, an extraction order when extracting a difference between each of three or more pieces of associated operation setting data that are associated with the three or more pieces of operation setting data in a one-to-one manner, extract the difference between each of the three or more pieces of associated operation setting data according to the decided extraction order, and generate difference information indicating the extracted difference between each of the three or more pieces of associated operation setting data, before a user requests;
to store in an arbitrary storage device, the difference information generated; and
to acquire the difference information from the storage device and output the acquired difference information to an arbitrary display device when the user requests.

2. The information processing apparatus according to claim 1,
wherein the processing circuitry decides the extraction order according to one of a descending order of the matching rates and an ascending order of the matching rates.

3. The information processing apparatus according to claim 1,
wherein the processing circuitry decides not to extract a difference between two pieces of associated operation setting data associated with two pieces of data matching rate between which is smaller than a threshold among the three or more pieces of operation setting data.

4. An information processing method comprising:
extracting a difference between each of three or more pieces of operation setting data which are pieces of data each of which is for setting operation in a device, by comparing each of the three or more pieces of operating setting data, computing a matching rate between each of the three or more pieces of operation setting data, deciding based on computed matching rates, an extraction order when extracting a difference between each of three or more pieces of associated operation setting data that are associated with the three or more pieces of operation setting data in a one-to-one manner, extracting the difference between each of the three or more pieces of associated operation setting data according to the decided extraction order, and generating difference information indicating the extracted difference between each of the three or more pieces of associated operation setting data, before a user requests;
storing in an arbitrary storage device, the generated difference information; and
acquiring the difference information from the storage device and outputting the acquired difference information to an arbitrary display device when the user requests.

5. A non-transitory computer readable medium storing an information processing program which causes a computer to execute:
a difference extraction process of extracting a difference between each of three or more pieces of operation setting data which are pieces of data each of which is for setting operation in a device, by comparing each of the three or more pieces of operating setting data, computing a matching rate between each of the three or more pieces of operation setting data, deciding based on computed matching rates, an extraction order when extracting a difference between each of three or more pieces of associated operation setting data that are associated with the three or more pieces of operation setting data in a one-to-one manner, extracting the difference between each of the three or more pieces of associated operation setting data according to the decided extraction order, and generating difference information indicating the extracted difference between each of the three or more pieces of associated operation setting data, before a user requests;
a difference information storing process of storing in an arbitrary storage device, the difference information generated by the difference extraction process; and
a request response process of acquiring the difference information from the storage device and outputting the acquired difference information to an arbitrary display device when the user requests.

* * * * *